US006357188B1

(12) United States Patent
Lee et al.

(10) Patent No.: US 6,357,188 B1
(45) Date of Patent: Mar. 19, 2002

(54) CONNECTOR FOR CONNECTING CABLE-PROTECTING PIPE

(76) Inventors: Hyang Jae Lee; Kum Ok Hyun, both of Garam APT 14-902, 986 Samchun-dong, Seo-ku, Taejun; Chung Ho Jeon, 164-7, Yongjeon-dong, Dong-ku, Taejun; Joo Han Lee, Garam APT 14-902, 986 Samchun-dong, Seo-ku, Taejun, all of (KR)

( * ) Notice: Subject to any disclaimer, the term of this patent is extended or adjusted under 35 U.S.C. 154(b) by 0 days.

(21) Appl. No.: 09/602,750

(22) Filed: Jun. 23, 2000

(30) Foreign Application Priority Data

Jun. 25, 1999 (KR) .............................. 99-24289

(51) Int. Cl.$^7$ ................................. E04C 2/52
(52) U.S. Cl. ..................... 52/220.8; 285/93; 285/124.3
(58) Field of Search ............................... 52/105, 220.8; 285/93, 45, 124.1, 124.2, 124.3, 124.4, FOR 108, FOR 110, FOR 118; 403/4, 331, 363, 381; 174/37, 39, 48, 49

(56) References Cited

U.S. PATENT DOCUMENTS

| 1,105,844 A | * 8/1914 | Schaperjahn | 285/45 X |
| 3,894,368 A | * 7/1975 | Crofoot | 52/105 |
| 4,019,760 A | * 4/1977 | Streit | 285/423 X |
| 4,054,000 A | * 10/1977 | Lisle | 52/105 X |
| 4,178,738 A | * 12/1979 | Hallock et al. | 403/381 X |
| 4,623,170 A | * 11/1986 | Cornwall | 52/220.8 X |
| 5,992,108 A | * 11/1999 | Falcey | 52/220.8 X |

FOREIGN PATENT DOCUMENTS

FR    2 305 674    * 10/1976    ......... 285/FOR 118

OTHER PUBLICATIONS

Korean Utility Model Publication No. 97–4492, May 1997.

* cited by examiner

Primary Examiner—Lynne H Browne
Assistant Examiner—Greg Binda
(74) Attorney, Agent, or Firm—Graybeal Jackson Haley LLP

(57) ABSTRACT

According to the present invention, there is provided a connector laid within a manhole wall for connecting cable-protecting pipes, including a body formed with a passage which said pipes can be inserted into, and a fixing member and a coupling member formed on both ends of said body, respectively, to be coupled and fixed each other, wherein said fixing member includes a first fixing protrusion and a first fixing groove formed on an outer surface of said body, respectively, to be located at the same surface as an end surface of said body and a second fixing protrusion and a second fixing groove formed on the outer surface of said body, respectively, to be located apart from the end surface of said body by a thickness of said first fixing protrusion and said first fixing groove. The end of said body formed with said fixing member is provided with a cover for preventing extraneous substance from invading inside of said body. An inner surface of said body is formed with a fixing sill to be inclined outward so that said fixing sill should engage with a slope of an end of said pipe inclined inward.

9 Claims, 6 Drawing Sheets

CONNECTOR FOR CONNECTING CABLE-PROTECTING PIPE

TECHNICAL FIELD

The present invention is directed to a connector laid within a manhole wall to be capable of fixedly connecting cable-protecting pipes. More particularly, the present invention is directed to a connector laid within a manhole wall for connecting cable-protecting pipes, so that extraneous substance and water can be prevented from invading the connector.

BACKGROUND OF THE INVENTION

In general, the electrical and communicational cables are contained in a pipe made of polyethylene and is laid underground. These cables protected by a pipe can be extended above the ground through a manhole for the electrical and communicational cables. In order to extend the cables above the ground, a connector laid within the manhole wall for connecting pipes is required.

A conventional art with respect to such connector is described in detail in Korean Utility Model Publication No. 97-4492, entitled by "DRIVING PIPE CONNECTOR IN MANHOLE", filed by the present applicant and issued.

Hereinafter, the conventional art will be described briefly.

As shown in FIG. 1 and FIG. 2, the conventional connector consists of a single body 10. This body 10 is formed with a penetrating hole 13, including two coaxial holes 11, 12 of diameters different from each other. An interface of two coaxial holes 11, 12 is formed with a catching step 14 for defining a inserted depth of a pipe, and an end portion of the body 10 is formed with an enlarged opening part 15 coaxial with said coaxial hole 11, of which diameter is enlarged toward an end.

Both ends of the body 10 are formed with square rims 16, respectively, and the square rims 16 are formed with coupling protrusions 17 and coupling grooves 18 in turns. By forming the coupling protrusions 17 and the coupling grooves 18 on the square rims 16, a plurality of connectors can be coupled for use.

A plurality of circular catching protrusions 19 are formed on the outer surface of the body 10 along the cylindrical outer surface thereof. The formation of the circular catching protrusions 19 increases the coupling area of the body 10 to the wall, so as to increase the coupling power (binding power) of the body 10 to the wall.

The aforementioned conventional connector has a catching step to define the inserted depth of a pipe but has not another element for fixing the pipe. Therefore, there is a problem that a coupling power of a pipe to the connector is weak.

Also, the conventional connector has not another element for preventing extraneous substance or water from invading the penetration hole 13. Therefore, there is a problem that the inflow of water causes damage of the pipe or the cable and the invasion of the extraneous substance causes increase of working time.

Also, when a plurality of conventional connectors are used coupled to one another, there is a problem that because the square rims completely cover the space between the connectors, whether or not concrete is sufficiently charged cannot be seen.

SUMMARY OF THE INVENTION

Therefore, the present invention is made in order to solve the aforementioned problems. An object of the present invention is to provide a connector laid within a manhole wall for connecting cable-protecting pipes, capable of preventing inflow of water and invasion of extraneous substance into the connector.

Other object of the present invention is to provide a connector capable of fixedly coupling a pipe thereto.

Also, another object of the present invention is to provide a connector capable of coupling one another and seeing a charged state of concrete into space between the connectors.

Still another object of the present invention is to provide a connector having a cover in which the assembling procedure is indicated thereon, to easily couple the connectors.

The above objects can be accomplished by a connector laid within a manhole wall for connecting cable-protecting pipes, including a body formed with a passage which said pipes can be inserted into, and a fixing member and a coupling member formed on both ends of said body, respectively, to be coupled and fixed each other. Said fixing member includes a first fixing protrusion and a first fixing groove formed on an outer surface of said body, respectively, to be located at the same surface as an end surface of said body and a second fixing protrusion and a second fixing groove formed on the outer surface of said body, respectively, to be located apart from the end surface of said body by a thickness of said first fixing protrusion and said first fixing groove. When several connectors are coupled one another, said first fixing protrusion engages with said first fixing groove and said second fixing protrusion engages with said second fixing groove.

It is preferable that the end of said body formed with said fixing member is provided with a cover for preventing extraneous substance f rom invading inside of said body.

It is more preferable that an inner surface of said body is formed with a fixing sill to be inclined outward so that said fixing sill should engage with a slope of an end of said pipe inclined inward.

Also, it is preferable that said first and second fixing groove are formed with a catching step, respectively, for defining an inserted depth of said first and second fixing protrusion fixed to said first and second fixing groove.

It is still preferable that said cover is formed with an indication part indicating an assembling direction and an assembling order.

It is still preferable that a rim of said cover is formed with a protrusion and the end surface of said body formed with said fixing member is formed with a groove for engaging with said protrusion, so as for said indication part to indicating a predetermined direction.

It is still preferable that a thickness of an edge of said indication part is less than that of a center of said indication part, so that said indication part can be easily separated from said cover by a predetermined force.

It is still preferable that the end surface of said body formed with said fixing member is provided with a packing surrounding said pipe for preventing inflow of water along a outer surface of said pipe, and an inner surface of said body is provided with a tightening device for sticking said packing fast to the outer surface of said pipe.

BRIEF DESCRIPTION OF THE DRAWINGS

The embodiments of the present invention will be explained with reference to the accompanying drawings, in which.

DETAILED DESCRIPTION OF THE INVENTION

The above objects, other objects, features and advantages of the present invention will be better understood from the following description taken in conjunction with the drawings.

Figure 1:
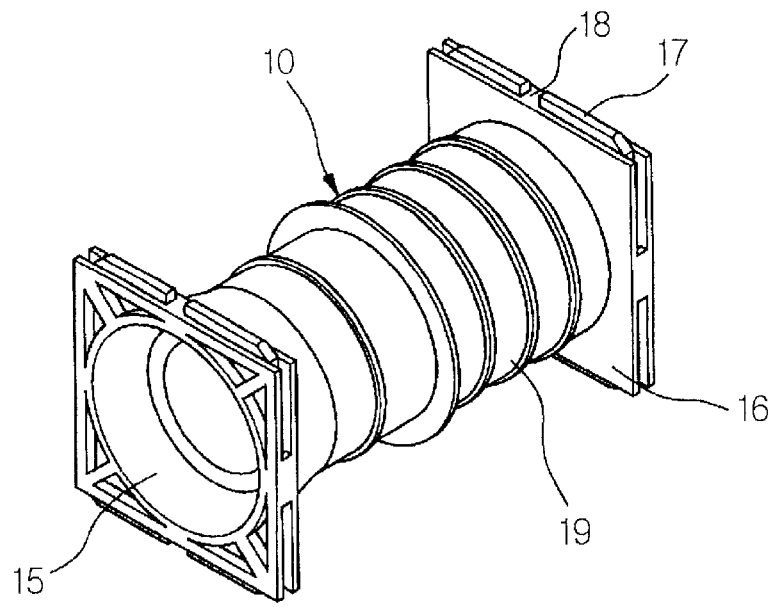
FIG. 1 is a perspective view of a connector according a conventional art.
Figure 2:
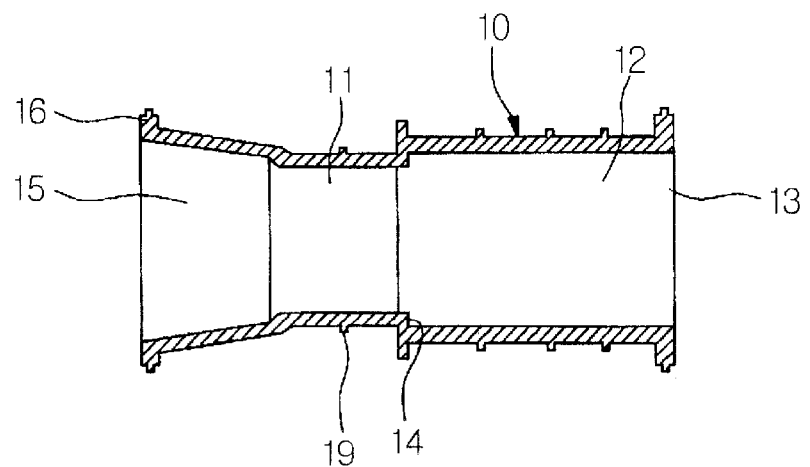
FIG. 2 is a cross-sectional view of the connector shown in FIG. 1.
Figure 3:
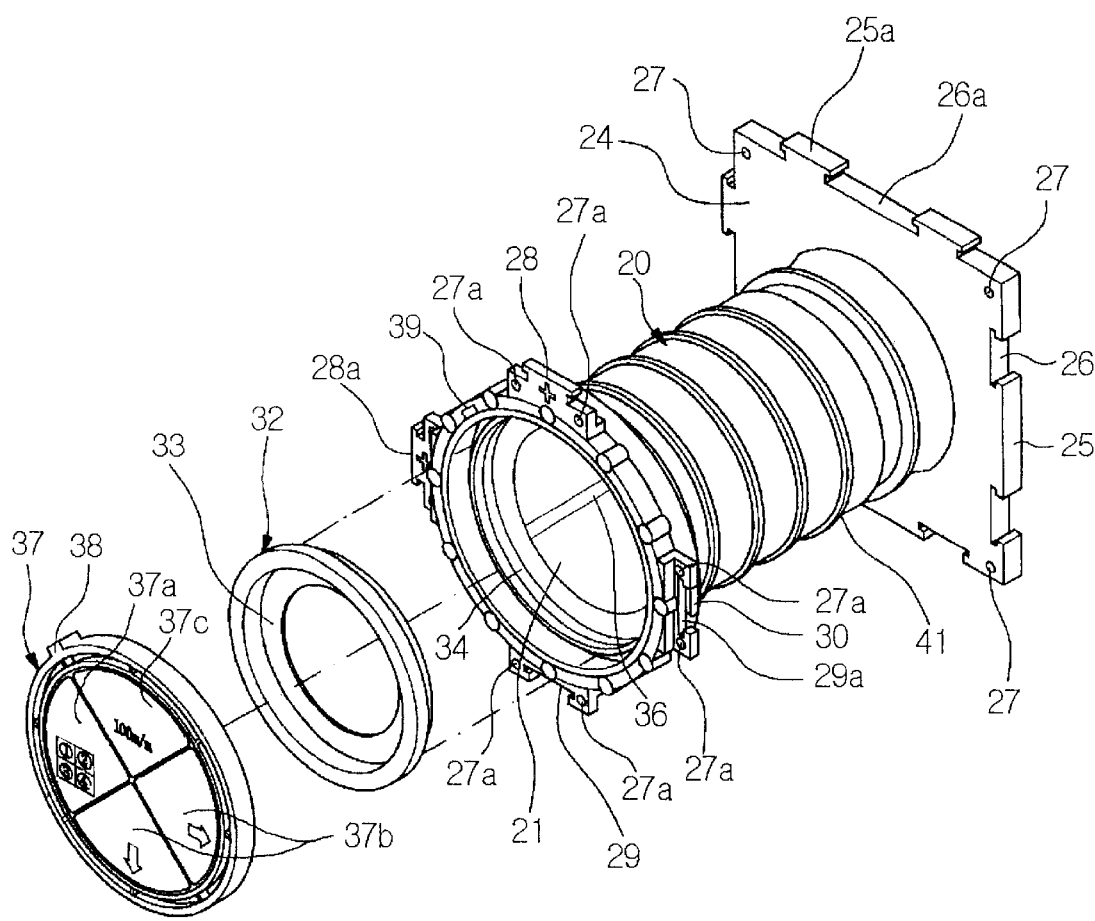
FIG. 3 is an exploded perspective view of a connector laid within a manhole wall for connecting cable-protecting pipes according to an embodiment of the present invention.

As shown in FIG. 3, the connector of the present invention consists of a single body 20. This body 20 is formed to have the same length as a thickness of a manhole wall, so that the connector is not protruded and work time is shortened.

As shown in FIGS. 5A, 5B, 7A and 7B, a center of the body 20 is formed with a passage 21 into which a pipe 50 for protecting cable can be inserted. Here, an end of the pipe 50 is formed with a slope 51 to be inclined inward by a predetermined angle.

An end of the passage 21 is formed a fixing sill 22 for define the inserted depth of the pipe 50 and to fix the pipe. This fixing sill 22 is formed to be inclined so that the slope 51 of the pipe 50 should engage with the fixing sill 22. That is, the fixing sill 22 is formed to be inclined outward.

An end of the fixing sill 22 is formed with a stopper 23 for preventing inflow of extraneous substance not to enable the extraneous substance to flow in the pipe 50 fixed to the fixing sill 22. Here, the stopper 23 in incorporated with the body 20, and a coupling power of the stopper 23 with the body 20 is so weak that the stopper 23 can be easily separated from the body 20 by a predetermined force.

Figure 4:
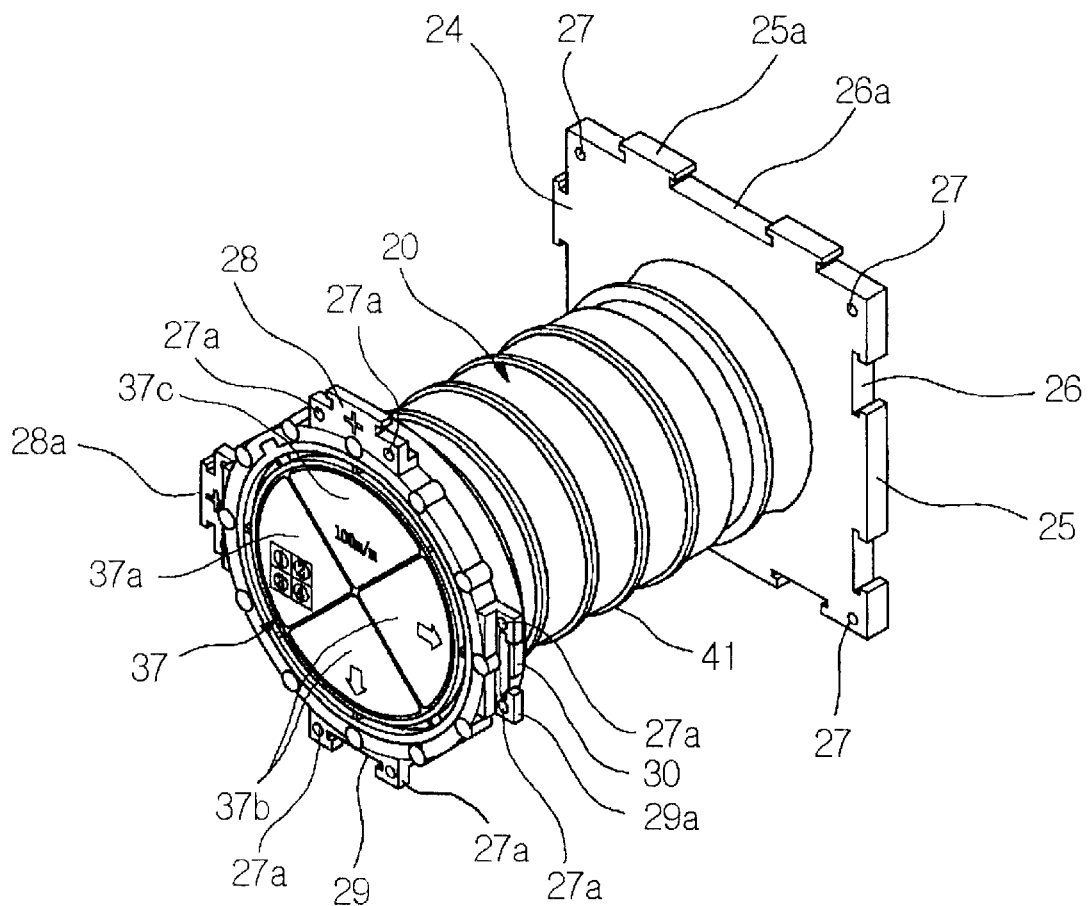
FIG. 4 is a perspective view illustrating a state in which elements of the connector shown in FIG. 3 have been assembled.
Figure 5A:
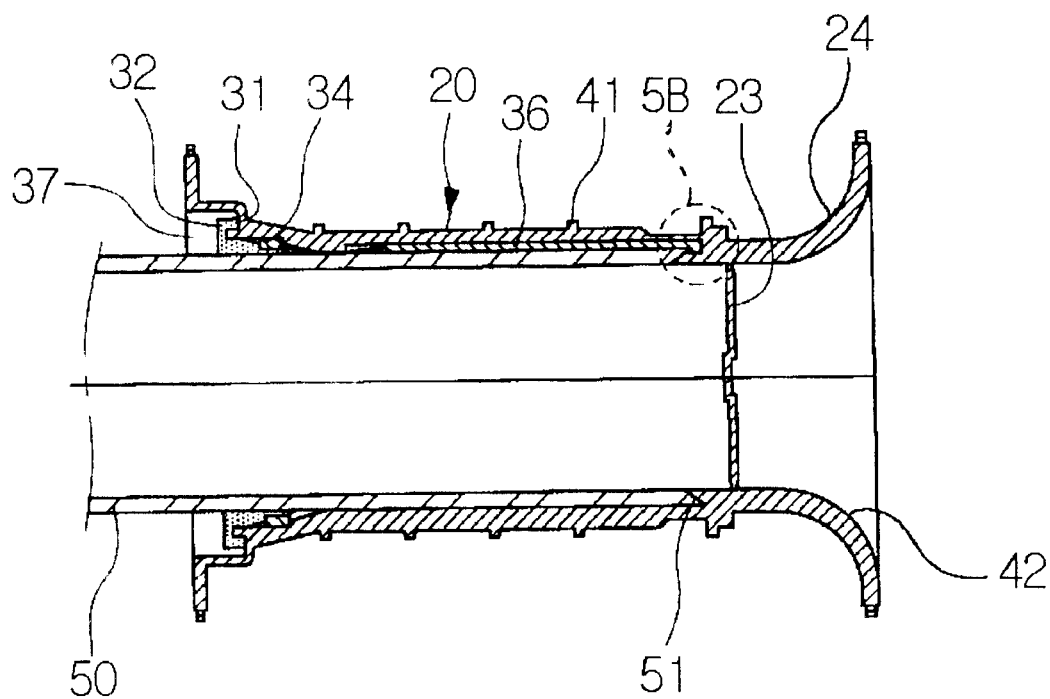
FIG. 5A is a cross-sectional view illustrating a state in which a pipe has been coupled to the connector shown in FIG. 4.
Figure 5B:
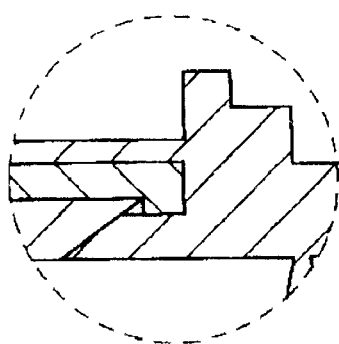
FIG. 5B is an enlarged view of a portion of the connector shown in FIG. 5A.

As shown in FIG. 3 and FIG. 4, the end of the body 20 formed with the stopper 23 for preventing inflow of extraneous substance is formed with a square rim 24. Two sides of the square rim 24 are formed with a first coupling protrusion 25 and two first coupling grooves 26, respectively, and other two sides of the square rim 24 are formed with two second coupling protrusions 25a and a second coupling groove 26a, respectively. Here, the first coupling protrusion 25 and the first coupling groove 26, and the second coupling protrusion 25a and the second coupling grooves 26a formed on opposite sides of the square rim 24 are formed to correspond to each other, respectively. That is, the first coupling protrusion and groove 25 and 26, and the second coupling protrusion and groove 25a and 26a of the opposite sides of the square rim 24 can engage with other, respectively.

An inside of the square rim 24 forms a trumpet 42 whose diameter is enlarged toward an end. An inner end of the trumpet 42 is connected to the stopper 23 for preventing inflow of extraneous substance. This shape of the trumpet 42 makes the inserting of cable easy. In order to prevent damage in inserting a cable, a part of the trumpet 42 of the body 20 connected to the stopper 23 for preventing inflow of extraneous substance may have an iron core built-in. Corners of the square rim 24 are formed with a coupling hole 27 to use for fixing the connector to a mould.

An outer surface of the other end of the body 20 is formed with a first and a second fixing protrusion 28 and 28a and a first and a second fixing groove 29 and 29a, respectively. That is, the first and the second fixing protrusion 28 and 28a, and a first and a second fixing groove 29 and 29a are formed discontinuously and thus, material quantity to be used for the fixing protrusions and grooves can be decreased. Also, because the discontinuous part makes the space between the connectors open when a plurality of connectors are assembled to be used, the charged state of concrete can be seen through the discontinuous part.

One first fixing protrusion 28 and one first fixing groove 29 are formed on the outer surface of the body 20 to be located at the same surface as an end surface of said body, and one second fixing protrusion 28a and one second fixing groove 29a are formed on the outer surface of said body, more or less apart form the end surface of the body 20. Here, the second fixing protrusion 28a and the second fixing groove 29a are located away from the end surface of said body 20 by a thickness of the first fixing protrusion 28 and the first fixing groove 29.

The first and second fixing protrusion 28 and 28a, and the first and second fixing groove 29 and 29a are disposed in the order of the second fixing groove 29a, the first fixing groove 29 and the second fixing protrusion 28a clockwise from the first fixing protrusion 28. When assembled, the first fixing protrusion 28 engages with the first fixing groove 29 of another connector and the second fixing protrusion 28a engages with the second fixing groove 29a of another connector.

A catching step 30 for defining the inserted depth of the first and second fixing protrusion 28 and 28a is formed below of the first and second 29 and 29a, respectively. When a plurality of connectors are assembled, the catching step 30 make both ends of all connectors form identical faces, respectively. Also, the first and second fixing protrusions 28 and 28a and the first and second grooves 29 and 29a are formed with two coupling holes 27a to use for fixing the connector to a mould.

The inner surface of the end of the body 20 formed with the first and second fixing protrusions 28 and 28a and the first and second grooves 29 and 29a is formed with a catching groove 31 having a diameter slightly smaller than a maximum diameter of a passage 21. Packing 32 formed with a catching hole (not shown) is inserted into the catching groove 31.

The packing 32 is formed with a rim part 33 having a diameter slightly smaller than a diameter of the pipe 50. That is, when the pipe 50 is inserted into the packing 32, the rim part 33 of the packing 32 is pushed inward to adhere closely to the outer surface of the pipe 50, so that water cannot flow in.

Below the catching groove 31, a receiving groove (not shown) is formed along the inner surface of the body 20, and a tightening band 34 is inserted into the receiving groove so that the tightening band 34 can move inward in a predetermined angle.

A guide groove 35 is formed on a predetermined position of the inner surface of the body 20, a dragging member 36 is received in the guide groove 35 and the dragging member 36 is connected to the tightening band 34 through a wire 40. An end of the dragging member 36 is formed with a catching protrusion 36a, and the remained part of the dragging member 36 except for the catching protrusion 36a is received in the guide groove 35 not to be projected from the inner surface of the body 20.

The length from the tightening band 34 to the end of the dragging member 36 is set so that when the pipe 50 is inserted into the passage 21 of the body 20, the tightening band 34 can move inward in a predetermined angle.

This construction of the tightening band 34 and the dragging member 36 enables the packing 32 to automatically tighten around the pipe 50 when the pipe 50 is inserted.

Above the packing 32, a cover 37 is provided preventing inflow of extraneous substance into the inside of the body 20 before the pipe 50 is inserted. The cover 37 is formed with indication parts indicating an assembling order 37a, assembling direction 37b, an allowable size 37c of pipe and the like, so that when a plurality of connectors are assembled for use, the assembling work can be easily performed. A thickness of an edge of each indication part is less than that of a center of each indication part, so that the indication parts can be easily separated from the cover 37 by a predetermined force before the pipe 50 is inserted.

An edge of the cover 37 is formed with a protrusion 38 in order for the indication parts to indicate a predetermined position. The end surface of the body 20 is formed with a receiving groove 39 for engaging with said protrusion, so that said indication part can be located at a predetermined position.

The outer surface of the body 20 is formed with a plurality of circular catching protrusions 41 in an axial direction. The circular catching protrusions 41 increase the coupling area of the body 20 to the wall, so to increase the coupling power (binding power) of the body 20 to the wall.

Now, a method of using the aforementioned connector according to the present invention will be described.

Figure 6:
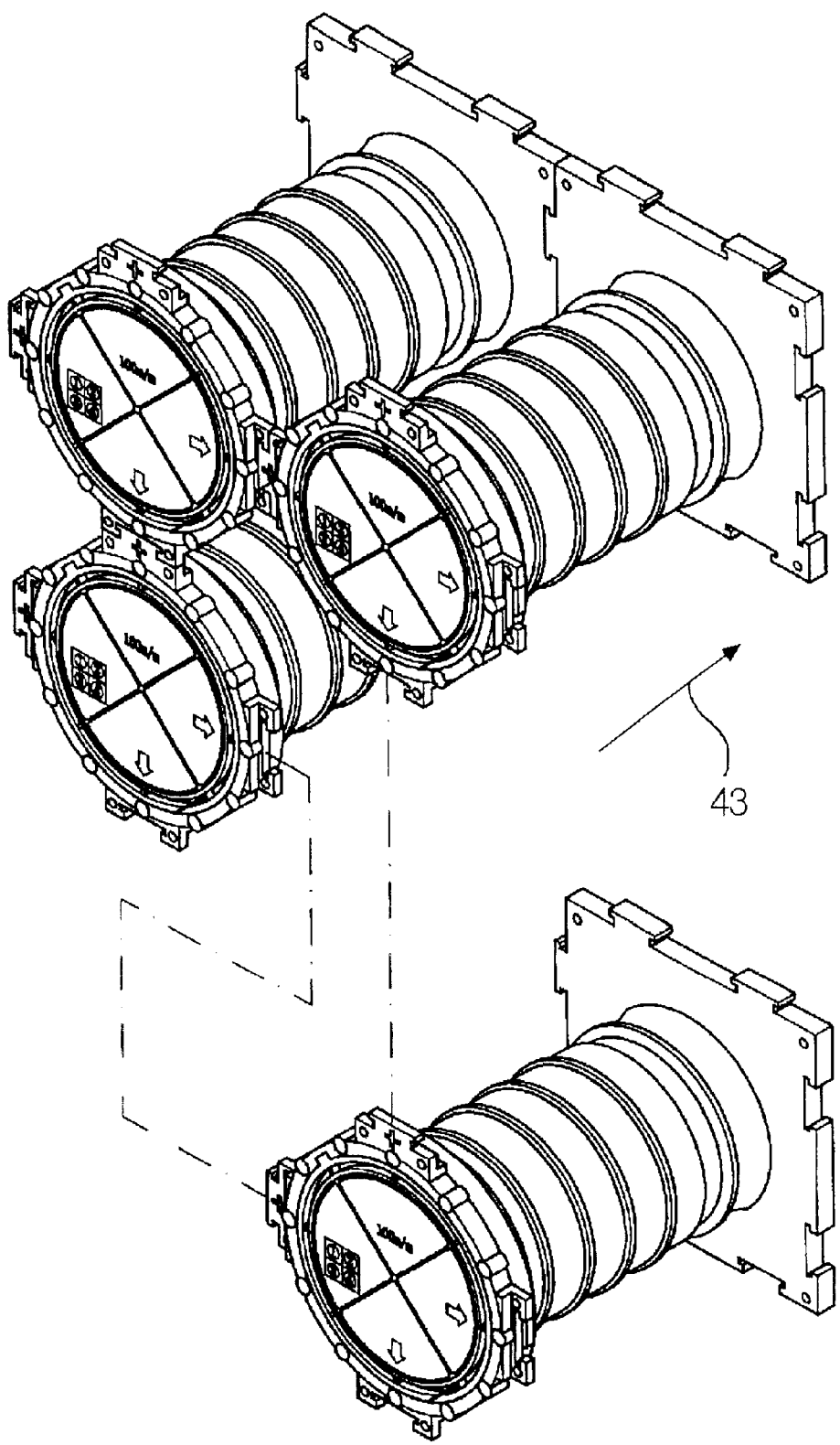
FIG. 6 is a perspective view illustrating a state in which a plurality of connectors shown in FIG. 4 have been coupled one another.
Figure 7A:
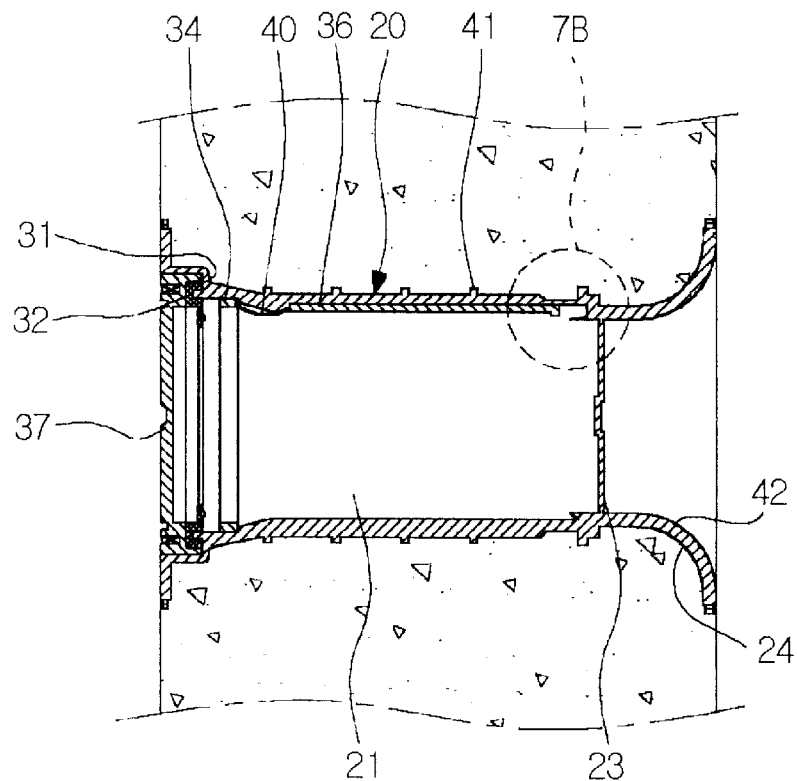
FIG. 7A is a cross-sectional view illustrating a stated in which the connector shown in FIG. 4 has been laid within a manhole wall.
Figure 7B:
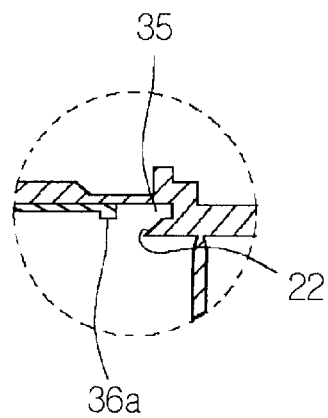
FIG. 7B is an enlarged view of a portion of the connector shown in FIG. 7A.

First, as shown in FIG. 6, a desired number of connectors are assembled according to the assembling order indicated on the cover 37. At that time, a plurality of connectors are coupled by moving each connector downward—in the direction of the arrow 43 in FIG. 6—and mutually coupling the fixing protrusions and the fixing grooves of the plurality of connectors.

After the desired number of connectors have been coupled one another, they are laid within the wall at the same time of molding the manhole wall. Then, the indication parts of the cover 37 are removed, adhesive is deposited on the fixing sill 22, and then the pipes 50 are inserted.

At that time, in a state where the end of the pipe 50 is caught by catching protrusion 36a of the dragging member 36, the pipe 50 proceeds inward, and the slope 51 of the pipe 50 engages with the fixing sill 22 to be fixed. According to the movement of the dragging member 36, the tightening band 34 moves inward in a predetermined angle to tighten the rim part 33 of the packing 32. Thus the rim part 33 of the packing 32 adheres closely to the outer surface of the pipe 50 to prevent inflow of water.

Then, a stopper 23 for preventing inflow of extraneous substance is removed and electric wire of communicational cable is inserted into the pipe 50.

According to the above-described connector of the present invention, a cover can prevent extraneous substance from invading inside of the connector before a pipe is inserted to shorten work time, and a packing can prevent water from flowing in the pipe to protect cable against damage.

Also, a fixing sill formed to be inclined can fix the pipe to protect cable for outer impacts.

Also, a coupling member and a fixing formed on both ends of the connector enable the connectors to be easily assembled, and the space between the connectors is open to see the charged state of concrete.

Also, because an assembling procedure is indicated on the cover, assembling the connectors can be easily performed.

Although technical spirit of the connector according to the present invention has been disclosed with reference to the appended drawings, descriptions in the present specification are only for illustrative purpose but not for limiting the present invention.

Also, those who are skilled in the art will appreciate that various modifications, additions and substitutions are possible without departing form the scope and spirit of the present invention as defined in the accompanying claims and the equivalents thereof.

What is claimed is:

1. A connector laid within a manhole wall for connecting cable-protecting pipes, comprising:
    a body formed with a passage in which a cable protecting pipe can be inserted; and
    a fixing member and a coupling member formed on both ends of said body, respectively, to be coupled and fixed each other,
    wherein said fixing member includes a first fixing protrusion and a first fixing groove formed on an outer surface of said body, respectively, to be located at the same surface as an end surface of said body, and a second fixing protrusion and a second fixing groove formed on the outer surface of said body, respectively, to be located apart from the end surface of said body by a thickness of said first fixing protrusion and said first fixing groove.

2. The connector according to claim 1, wherein said first fixing protrusion engages with said first fixing groove and said second fixing protrusion engages with said second fixing groove when a plurality of said connectors are coupled one another.

3. The connector according to claim 1, wherein the end of said body formed with said fixing member is provided with a cover for preventing extraneous substance from invading inside of said body.

4. The connector according to claim 3, wherein said cover is formed with an indication part indicating an assembling direction, an assembling order and/or allowable pipe size.

5. The connector according to claim 4, wherein a rim of said cover is formed with a protrusion and the end surface of said body formed with said fixing member is formed with a groove for engaging with said protrusion, so that said indication part can be located at a predetermined direction.

6. The connector according to claim 4, wherein a thickness of an edge of each indication part is less than that of a center of each indication part, so that said indication part can be easily separated form said cover by a predetermined force.

7. The connector according to claim 3, wherein the end surface of said body formed with said fixing member is provided with a packing surrounding said pipe for preventing inflow of water along an outer surface of said pipe, and an inner surface of said body is provided with a tightening band for sticking said packing fast to the outer surface of said pipe.

8. The connector according to claim 1, wherein an inner surface of said body is formed with a fixing sill to be inclined outward so that said fixing sill should engage with a slope of an end of said pipe inclined inward.

9. The connector according to claim 1, wherein said first and second fixing grooves are formed with a catching step, respectively, for defining an inserted depth of said first and second fixing protrusions fixed to said first and second fixing grooves.

* * * * *